No. 732,882. PATENTED JULY 7, 1903.
A. S. NELSON, A. STEWART & T. J. FOSTER.
BOGIE OR TRUCK FOR TRAMWAY CARS, RAILWAY CARRIAGES, OR THE LIKE.
APPLICATION FILED DEC. 13, 1902.
NO MODEL.
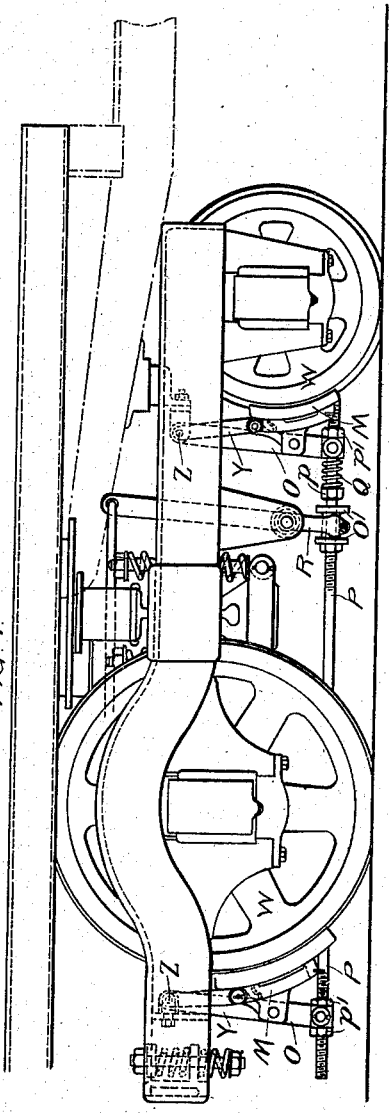
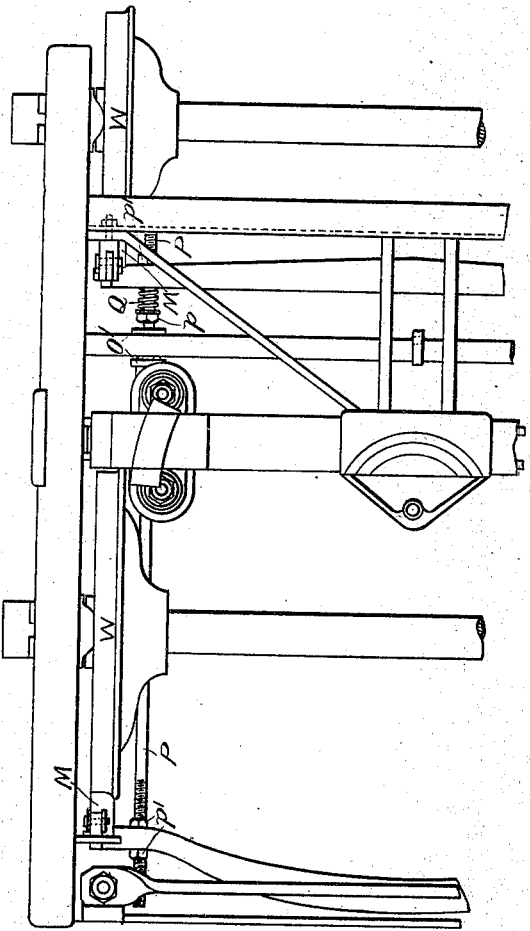

No. 732,882.

Patented July 7, 1903.

UNITED STATES PATENT OFFICE.

ANDREW S. NELSON, ALBERT STEWART, AND THOMAS JOHNSON FOSTER, OF MOTHERWELL, SCOTLAND.

BOGIE OR TRUCK FOR TRAMWAY-CARS, RAILWAY-CARRIAGES, OR THE LIKE.

SPECIFICATION forming part of Letters Patent No. 732,882, dated July 7, 1903.

Application filed December 13, 1902. Serial No. 135,132. (No model.)

*To all whom it may concern:*

Be it known that we, ANDREW SCLANDERS NELSON, ALBERT STEWART, and THOMAS JOHNSON FOSTER, subjects of the King of the United Kingdom of Great Britain and Ireland, all residing at the Glasgow Rolling Stock and Plant Works, Motherwell, in the county of Lanark, Scotland, have invented certain new and useful Improvements in Bogies or Trucks for Tramway-Cars, Railway-Carriages, or the Like, (for which application for patent has been made in Great Britain, No. 25,550, dated December 14, 1901,) of which the following is a specification.

This invention relates to brakes for bogies or trucks having four wheels, but especially for the type known as "maximum traction-truck;" and the invention has for its object to provide means for adjusting the brake to take up wear and for distribution of pressure upon the wheels.

In the accompanying drawings, which illustrate the invention, Figure 1 is a side elevation, and Fig. 2 a plan, of part of a truck fitted with the improved braking device.

As shown in the drawings, the usual brake-levers O are suspended at the pivots Z from the side bars of the truck. The brake-levers O carry the usual cast-iron brake-blocks M, acting on all the wheels of the bogie, the blocks being preferably made with the wearing parts separate and easily detachable. The brake-blocks are further supported to the pivots Z by means of hangers Y. Secured to the brake-levers O are connecting-rods P, to which is secured in turn the application-lever R.

The brake-levers O or the rods P are provided with means of adjustment, such as the nuts $p'$, at both ends or at one end only, as may be desired. For the purpose of adjusting the brake-blocks to take up wear the end of the application-lever R is fitted between flanges $o'$ on an adjusting-nut on the rod P, so that on turning the nuts the rod P may be traversed to bring the blocks more or less near the wheels. While the blocks are applied simultaneously to all the wheels W, the application-levers are arranged so that any desired proportion of the brake-power may be applied to any pair of wheels and the balance to the others. This adjustment is effected by providing a spring Q around the rod P between the lever O and an adjusting-nut $p$ on the rod, which may be turned to more or less compress the spring, so that when the brakes are applied by means of the brake-lever R the brake-block may be fully applied to the larger wheels, while the spring yielding lessens the pressure of the brake for the smaller wheels.

Having now particularly described our invention, what we claim, and desire to secure by Letters Patent, is—

In combination with a truck for tram-cars and like vehicles a brake comprising brake-levers O, pivots Z suspending said levers O from the truck, brake-blocks M carried on said levers O, hangers Y connecting said blocks M to pivots Z, connecting-rods P at either side of the truck connecting the levers O, nuts $p, p'$ adjusting the position of the levers O and the brake-blocks M relatively to rods P, helical springs interposed between the nuts $p$ and the levers O at one end of the rods P, application-levers R, pivoted to the truck, adjusting-nuts $o'$ on the rods P engaging the ends of levers R and movable on the rods P, as and for the purpose set forth.

In witness whereof we have hereunto set our hands in presence of two witnesses.

ANDREW S. NELSON.
ALBERT STEWART.
THOMAS JOHNSON FOSTER.

Witnesses:
ARTHUR BURNS,
MARY CLARKE.